(12) United States Patent
Lin et al.

(10) Patent No.: US 10,830,662 B2
(45) Date of Patent: Nov. 10, 2020

(54) FLUID LEAK DETECTOR (71) Applicant: COOLER MASTER CO., LTD., New Taipei (TW)

(72) Inventors: Wen-Hsien Lin, New Taipei (TW); Shui-Fa Tsai, New Taipei (TW); Wen-Hong Chen, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 142 days.

(21) Appl. No.: 16/155,710

(22) Filed: Oct. 9, 2018

(65) Prior Publication Data

US 2019/0107459 A1 Apr. 11, 2019

Related U.S. Application Data

(60) Provisional application No. 62/571,231, filed on Oct. 11, 2017.

(30) Foreign Application Priority Data

Sep. 19, 2018 (TW) .............................. 107212774 U (51) Int. Cl.
*G01M 3/16* (2006.01)
*G01M 3/40* (2006.01)

(52) U.S. Cl.
CPC ................ *G01M 3/16* (2013.01); *G01M 3/40* (2013.01)

(58) Field of Classification Search
CPC .......... G01M 3/16; G01M 3/40; H01R 24/60; A24F 47/008
USPC .............................................................. 73/40
See application file for complete search history.

(56) References Cited

U.S. PATENT DOCUMENTS

| 3,721,898 | A | * | 3/1973 | Dragoumis | ........... | G01M 3/045 |
| | | | | | | 324/693 |
| 4,332,170 | A | * | 6/1982 | Belval | .................. | G21C 17/002 |
| | | | | | | 340/605 |
| 7,398,676 | B2 | * | 7/2008 | Lim | ........................ | G01M 3/16 |
| | | | | | | 340/604 |
| 8,002,315 | B2 | * | 8/2011 | Engle | ....................... | G01K 1/14 |
| | | | | | | 137/557 |
| 8,087,430 | B1 | * | 1/2012 | Betz | ....................... | F16L 11/12 |
| | | | | | | 138/104 |
| 9,482,590 | B2 | * | 11/2016 | Banyard | ................... | F22B 1/28 |
| 2017/0181792 | A1 | * | 6/2017 | Lin | ....................... | A61B 18/148 |

* cited by examiner

*Primary Examiner* — Octavia Hollington
(74) *Attorney, Agent, or Firm* — Maschoff Brennan (57) ABSTRACT

A fluid leak detector which is configured to be disposed on a flow tube. The fluid leak detector includes an insulation sleeve and at least one wire set. The insulation sleeve has water absorption property. The insulation sleeve is configured to be sleeved on the flow tube. The at least one wire set includes a first electrode wire and a second electrode wire. The first electrode wire and the second electrode wire are disposed on the insulation sleeve. The first electrode wire and the second electrode wire are separated from each other but are connected to each other via the insulation sleeve.

14 Claims, 12 Drawing Sheets

FLUID LEAK DETECTOR

CROSS-REFERENCE TO RELATED APPLICATIONS

This non-provisional application claims priority under 35 U.S.C. § 119(a) on Patent Application No. 62/571,231 filed in U.S.A on Oct. 11, 2017 and Patent Application No. 107212774 filed in Taiwan, R.O.C. on Sep. 19, 2018, the entire contents of which are hereby incorporated by reference.

TECHNICAL FIELD

The present disclosure relates to a fluid leak detector, more particularly to a fluid leak detector for detecting fluid leak from a flow tube.

BACKGROUND

As the performance of electronic components, such as central processing unit or graphics processing unit of electronic devices (e.g., servers) largely improves, more heat are generated therefrom. As a result, the heat dissipation method of electronic devices is turned into liquid cooling replacing the traditional way of air cooling by fans. The heat dissipation of the electronic components by liquid cooling is more efficient than by air cooling.

Generally, the cooling liquid is transferred via a flow tube, but the flow tube is easily broken during the transportation. A crack may occur on the flow tube and causes liquid leak. Usually, there is a liquid leak detector disposed at the bottom of the electronic device for detecting liquid leak from the flow tube. However, the liquid leak detector is unable to immediately warn the liquid leak because the liquid leak may not drop down immediately or may not drop on the detecting area of the detector. Accordingly, how to timely warn the user that the existence of a liquid leak of the flow tube is still an issue in this field.

SUMMARY

The present disclosure disclosing a fluid leak detector which is able to immediately detect fluid leak from a flow tube.

According to one aspect of the present disclosure, a fluid leak detector which is configured to be disposed on a flow tube. The fluid leak detector includes an insulation sleeve and at least one wire set. The insulation sleeve has water absorption property. The insulation sleeve is configured to be sleeved on the flow tube. The at least one wire set includes a first electrode wire and a second electrode wire. The first electrode wire and the second electrode wire are disposed on the insulation sleeve. The first electrode wire and the second electrode wire are separated from each other but are connected to each other via the insulation sleeve.

According to another aspect of the present disclosure, a fluid leak detector which is configured to be disposed on a flow tube. The fluid leak detector includes a mount base and at least one conductive terminal set. The mount base is configured to surround the flow tube. The at least one conductive terminal set includes a first conductive terminal and a second conductive terminal. The first conductive terminal and the second conductive terminal are disposed on the mount base and are separated from each other. The first conductive terminal and the second conductive terminal each have a first side, which is configured to press against the flow tube and a second side, which is exposed.

According to the fluid leak detector discussed above, the first electrode wire and the second electrode wire are connected to each other via the insulation sleeve that has water absorption property, thus the insulation sleeves is able to absorb fluid which leaks from the flow tube and then the first electrode wire and the second electrode wire can be electrically connected to each other by the fluid in the insulation sleeve so as to form a conduction circuit between the first electrode wire and the second electrode wire, timely sending out the warning of the existence of a fluid leak in the flow tube.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
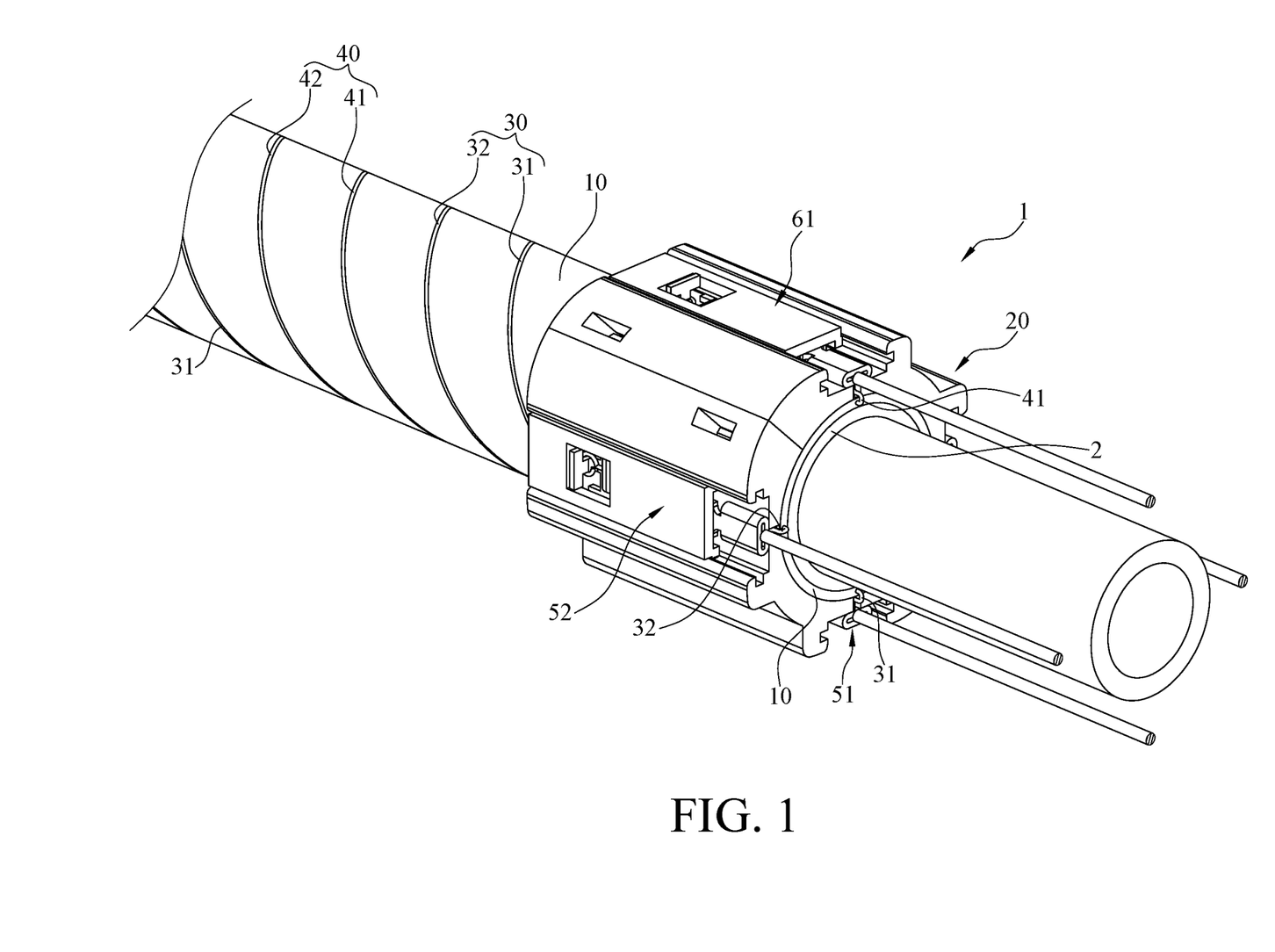
FIG. 1 is a perspective view of a fluid leak detector being disposed on a flow tube according a first embodiment of the present disclosure.
Figure 2:
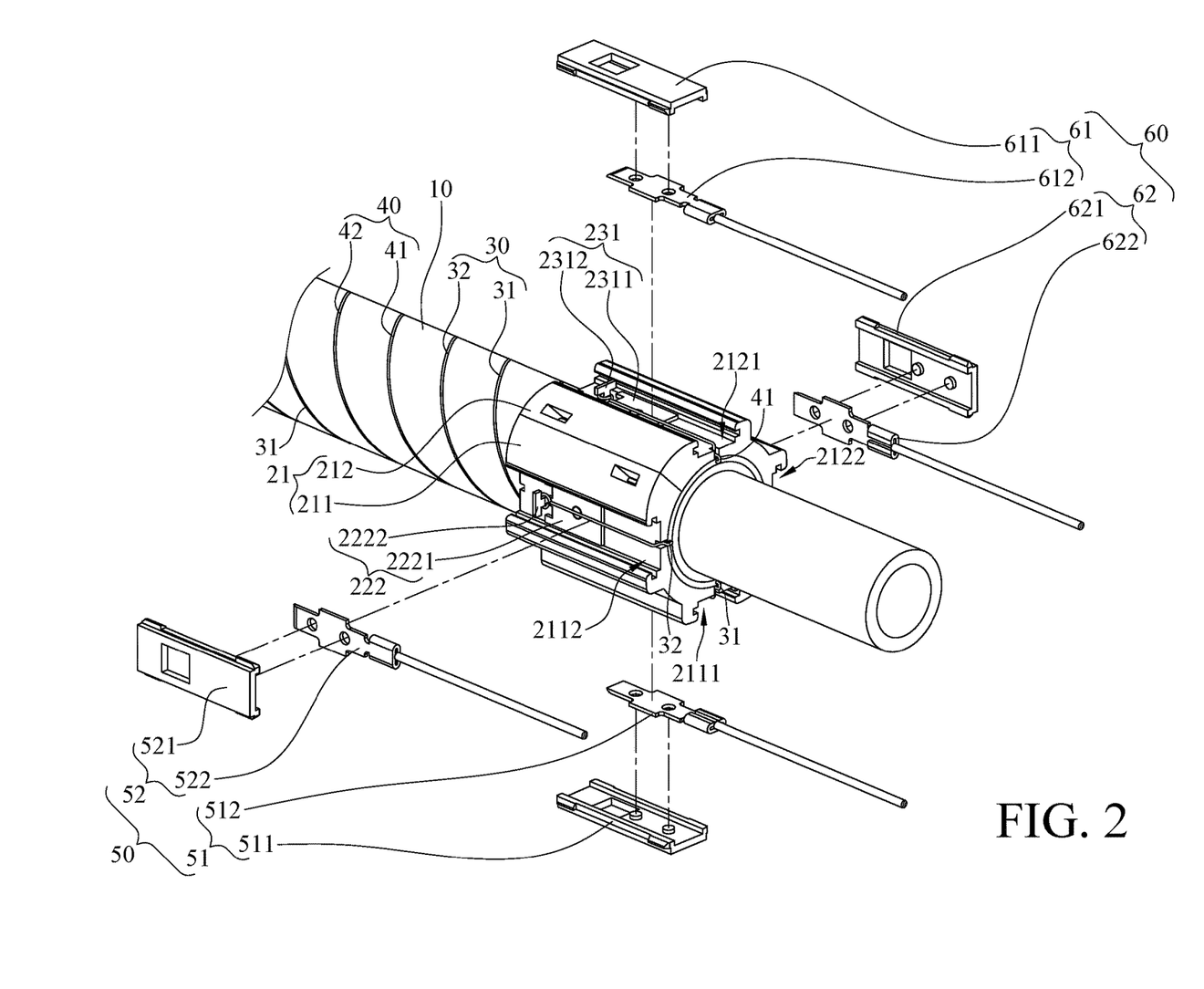
FIG. 2 is a partial exploded view of the fluid leak detector and the flow tube in FIG. 1.
Figure 3:
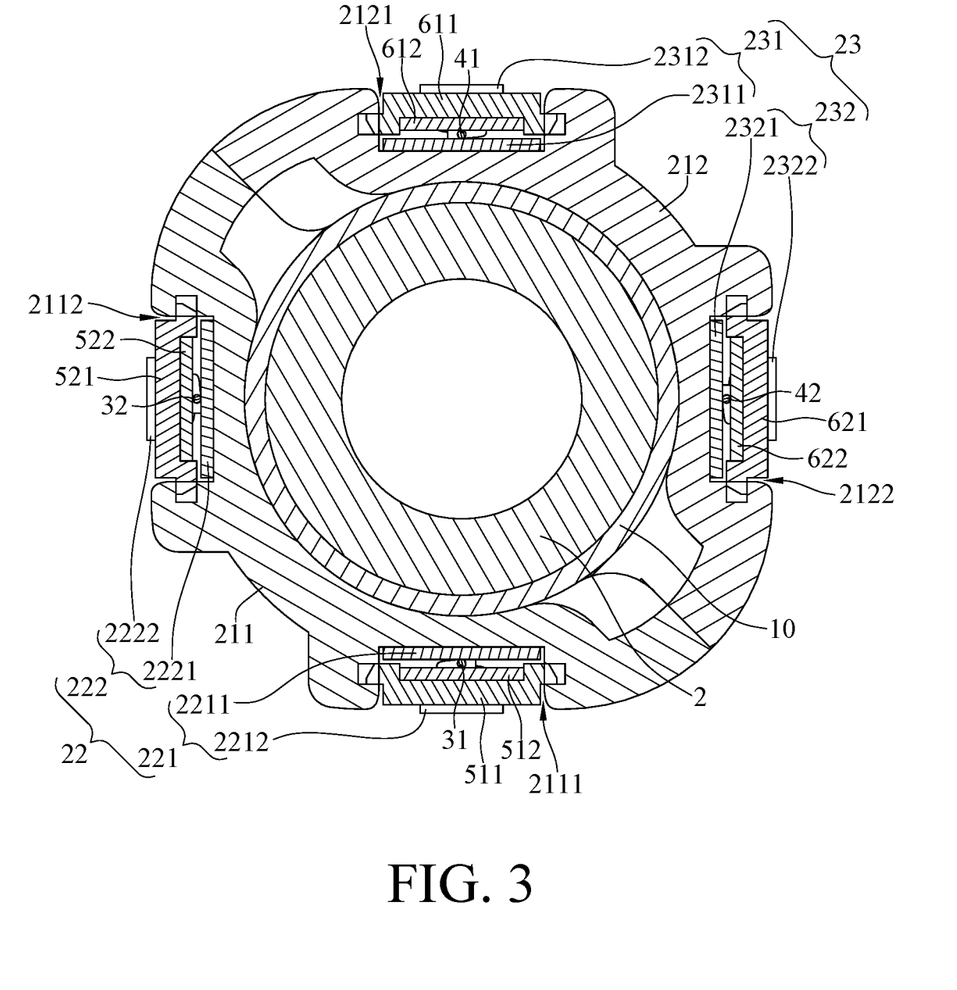
FIG. 3 is a cross-sectional view of the fluid leak detector and the flow tube in FIG. 1.

Please refer to FIG. 1 to FIG. 3. FIG. 1 is a perspective view of a fluid leak detector being disposed on a flow tube according a first embodiment of the present disclosure. FIG. 2 is a partial exploded view of the fluid leak detector and the flow tube in FIG. 1. FIG. 3 is a cross-sectional view of the fluid leak detector and the flow tube in FIG. 1.

This embodiment provides a fluid leak detector 1 configured to detect fluid leak from a flow tube 2. The fluid leak detector 1 includes an insulation sleeve 10, two wire sets 30 and 40, a fastener 20 and two connecting terminal sets 50 and 60.

In this embodiment, the insulation sleeve 10 is configured to be sleeved on the flow tube 2. The insulation sleeve 10 may be a composite sleeve made using mesh made from cotton and nylon. The insulation sleeve 10 has water absorption property.

The wire set 30 includes a first electrode wire 31 and a second electrode wire 32, and the wire set 40 includes a first electrode wire 41 and a second electrode wire 42. The first electrode wires 31 and 41 and the second electrode wires 32 and 42 are, for example, copper wires and are disposed on the insulation sleeve 10. In more detail, the two first electrode wires 31 and 41 and the two second electrode wires 32 and 42 are, for example, woven with the material of the insulation sleeve 10 and are arranged in a helical manner. Also, the first electrode wires 31 and 41 and the second electrode wires 32 and 42 are arranged alternately. As shown in the figure, the second electrode wire 32 is located between the first electrode wire 31 and the first electrode wire 41, and the first electrode wire 41 is located between the second electrode wire 32 and the second electrode wire 42. In short, each first electrode wire is located between the other two second electrode wires. In addition, the first electrode wires 31 and 41 and the second electrode wires 32 and 42 are connected to each other via the insulation sleeve 10 but are not electrically connected to each other when the insulation sleeve 10 does not yet absorb water.

The fastener 20 includes a mount base 21 and two conductive terminal sets 22 and 23. The mount base 21 includes a first mounting component 211 and a second mounting component 212. The first mounting component 211 and the second mounting component 212 are detachably assembled together so as to surround the insulation sleeve 10. The first mounting component 211 has a first assembly groove 2111 and a second assembly groove 2112, and the second mounting component 212 has a first assembly groove 2121 and a second assembly groove 2122. The first assembly groove 2111 and the second assembly groove 2112 of the first mounting component 211 are separated from each other, and the first assembly groove 2121 and the second assembly groove 2122 of the second mounting component 212 are separated from each other. The first assembly grooves 2111 and 2121 and the second assembly grooves 2112 and 2122 are located at different sides of the insulation sleeve 10. Specifically, the first assembly grooves 2111 and 2121 are located at two opposite sides of the insulation sleeve 10, and the second assembly grooves 2112 and 2122 are located at another two opposite sides of the insulation sleeve 10.

The conductive terminal set 22 includes a first conductive terminal 221 and a second conductive terminal 222, and the conductive terminal sets 23 includes a first conductive terminal 231 and a second conductive terminal 232. The first conductive terminal 221 includes a base portion 2211 and a connecting portion 2212. The second conductive terminal 222 includes a base portion 2221 and a connecting portion 2222. The first conductive terminal 231 includes a base portion 2311 and a connecting portion 2312. The second conductive terminal 232 includes a base portion 2321 and a connecting portion 2322. The base portion 2211 of the first conductive terminal 221 and the base portion 2221 of the second conductive terminal 222 are respectively disposed in the first assembly groove 2111 and the second assembly groove 2112 of the first mounting component 211. The connecting portion 2212 of the first conductive terminal 221 and the connecting portion 2222 of the second conductive terminal 222 respectively protrude from the base portions 2211 and 2221 away from the first fastening component 211. The base portion 2311 of the first conductive terminal 231 and the base portion 2321 of the second conductive terminal 232 are respectively disposed in the first assembly groove 2121 and the second assembly groove 2122 of the second mounting component 212. The connecting portion 2312 of the first conductive terminal 231 and the connecting portion 2322 of the second conductive terminal 232 respectively protrude from the base portions 2311 and 2321 away from the second fastening component 212.

The first electrode wires 31 and 41 and the second electrode wires 32 and 42 are respectively disposed at the connecting portions 2212, 2312, 2222 and 2322. In this embodiment, the first electrode wires 31 and 41 and the second electrode wires 32 and 42 are respectively fixed at the connecting portion 2212, 2312, 2222 and 2322 by, for example, winding so that the thin wire is easily fixed to the conductive terminal.

The connecting terminal set 50 includes a first connecting terminal 51 and a second connecting terminal 52. The connecting terminal set 60 includes a first connecting terminal 61 and a second connecting terminal 62. The first connecting terminal 51 includes a cover 511 and a conductive component 512. The second connecting terminal 52 includes a cover 521 and a conductive component 522. The first connecting terminal 61 includes a cover 611 and a conductive component 612. The second connecting terminals 62 includes a cover 621 and a conductive component 622. The four conductive components 512, 522, 612 and 622 are respectively disposed to the four covers 511, 521, 611 and 621. The cover 511 of the first connecting terminal 51 and the cover 521 of the second connecting terminal 52 are respectively detachably disposed in the first assembly groove 2111 and the second assembly groove 2112 of the first mounting component 211. The conductive component 512 of the first connecting terminal 51 and the conductive component 522 of the second connecting terminal 52 respectively press against the first electrode wire 31 and the second electrode wire 32 and are respectively electrically connected to the first electrode wire 31 and the second electrode wire 32. The cover 611 of the first connecting terminal 61 and the cover 621 of the second connecting terminal 62 are respectively detachably disposed in the first assembly groove 2121 and the second assembly groove 2122 of the second mounting component 212. The conductive components 612 of the first connecting terminal 61 and the conductive component 622 of the second connecting terminal 62 respectively press against the first electrode wire 41 and the second electrode wire 42 and are respectively electrically connected to the first electrode wire 41 and the second electrode wire 42.

Figure 4:
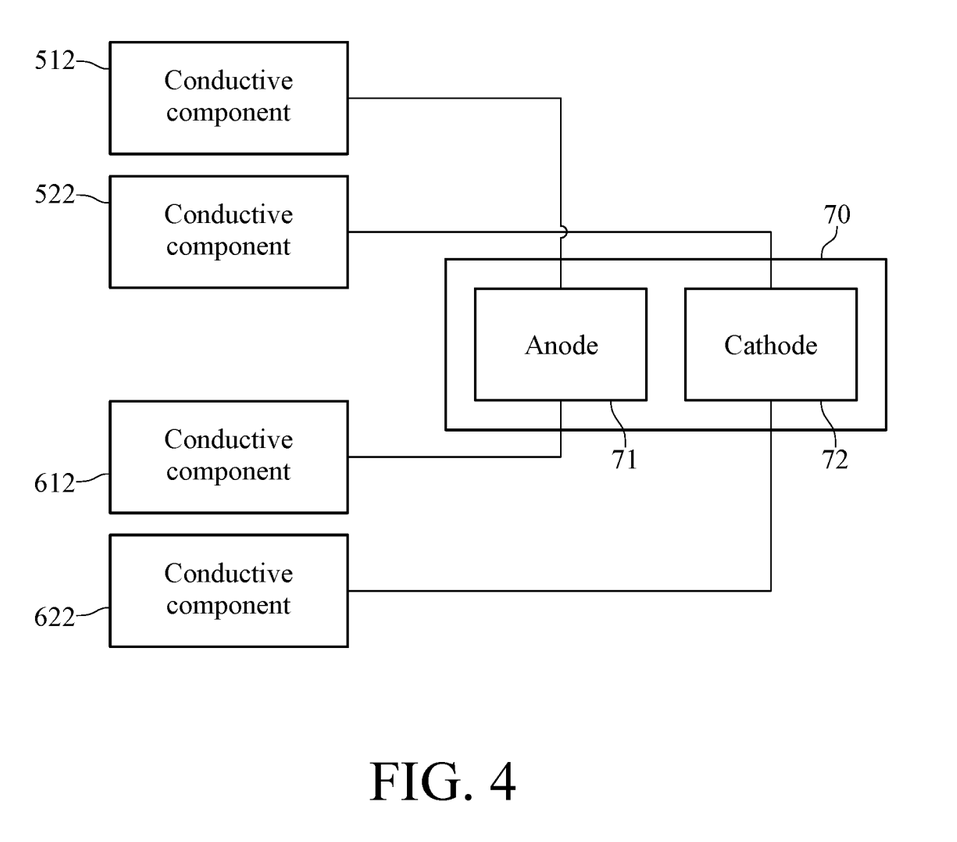
FIG. 4 is a block diagram that shows the connections among some of the components in the fluid leak detector in FIG. 1.

Then, please refer to FIG. 2 to FIG. 4, wherein FIG. 4 is a block diagram that shows the connections among some of the components in the fluid leak detector in FIG. 1.

In this embodiment, the fluid leak detector 1 further includes a signaling device 70. The signaling device 70 is, for example, a light-emitting diode. The signaling device 70 has an anode 71 and a cathode 72. The conductive components 512 and 612 are electrically connected to the anode 71 of the signaling device 70. The conductive components 522 and 622 are electrically connected to the cathode 72 of the signaling device 70. In other embodiments, the signaling device can be a buzzer that can produce audio signal.

The fluid leak detection of the fluid leak detector 1 is described hereinbelow. Please refer to FIG. 3 to FIG. 5, wherein FIG. 5 is a partially enlarged view of the fluid leak detector when fluid leak occurs.

Figure 5:
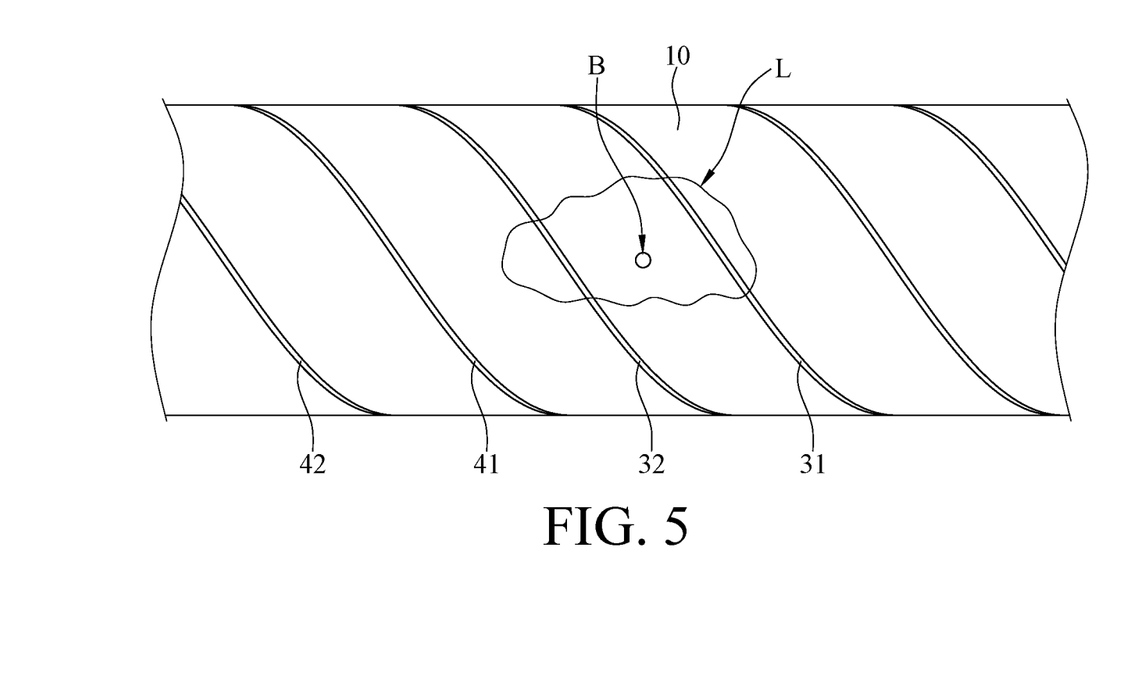
FIG. 5 is a partially enlarged view of the fluid leak detector when fluid leak occurs.

As shown in FIG. 5, when there is a crack B on the flow tube 2, fluid L leaks from the crack B and is absorbed by the insulation sleeve 10, and then the fluid L diffuse into the insulation sleeve 10. When the fluid L reaches the first electrode wire 31 and the second electrode wire 32 adjacent to each other at the same time, the first electrode wire 31 and the second electrode wire 32 are able to be electrically connected to each other via the portion of the insulation sleeve 10 that contains the fluid L. This will cause the anode 71 of the signaling device 70, the conductive component 512, the first electrode wire 31, the second electrode wire 32, the conductive component 522, and the cathode 72 of the signaling device 70 to form an electrical circuit. As a result, the signaling device 70 is turned on to warn the user that the existence of a fluid leak in the flow tube 2.

In addition, since the first electrode wires 31 and 41 and the second electrode wires 32 and 42 are arranged alternately, wherever the fluid leak occurs on the flow tube 2, such as between the first electrode wire 31 and the second electrode wire 32, between the second electrode wire 32 and the first electrode wire 41, between the first electrode wire 41 and the second electrode wire 42 or between the second electrode wire 42 and the first electrode wire 31, the signaling device 70 all can be turned by the fluid leak from the crack. Therefore, the arrangement of the first electrode wires 31 and 41 and second electrode wires 32 and 42 helps to improve the sensitivity of detecting the fluid leak on the flow tube 2.

In this embodiment, the fluid leak detector 1 includes two wire sets (i.e., the wire sets 30 and 40), but the disclosure is not limited thereto. In other embodiments, the fluid leak detector may include only one wire set or more than two wire sets. In the case that the fluid leak detector includes only one wire set, it only requires one connecting terminal set. In the case that the fluid leak detector includes three wire sets, it requires three connecting terminal sets accordingly. It is understood that the distance between the first electrode wire and the second electrode wire decreases as the amount of the wire set increases, and it helps to further improve the sensitivity of detection.

Furthermore, the amount of the signaling device is not restricted. In other embodiments, the fluid leak detector may include two signaling devices; in such a case, a first connecting terminal and a second connecting terminal of a connecting terminal set are respectively electrically connected to a signaling device, and the other first connecting terminal and the other second connecting terminal of the other connecting terminal set are respectively electrically to the other signaling device. By doing so, the two signaling devices can produce different warning signals for fluid leak occurs between different first electrode wires and different second electrode wires.

In this embodiment, the first electrode wires 31 and 41 and the second electrode wires 32 and 42 are respectively fixed at the connecting portion 2212, 2312, 2222 and 2322 by, for example, winding so that the thin wire is easily fixed to the conductive terminal.

In this embodiment, the first electrode wires 31 and 41 and the second electrode wires 32 and 42 are respectively directly fixed at the connecting portion 2212, 2312, 2222 and 2322 by, for example, winding so that there is no need to wrap the first electrode wires 31 and 41 and the second electrode wires 32 and 42 by, for example, insulation tapes.

Accordingly, the conductive components 512, 612, 522, and 622 are respectively electrically connected to the first electrode wires 31 and 41 and the second electrode wires 32 and 42 via the covers 511, 611, 521, and 621. As a result, the fluid leak near the fastener 20 can be also detected by the first electrode wires 31 and 41 and the second electrode wires 32 and 42.

Figure 6:
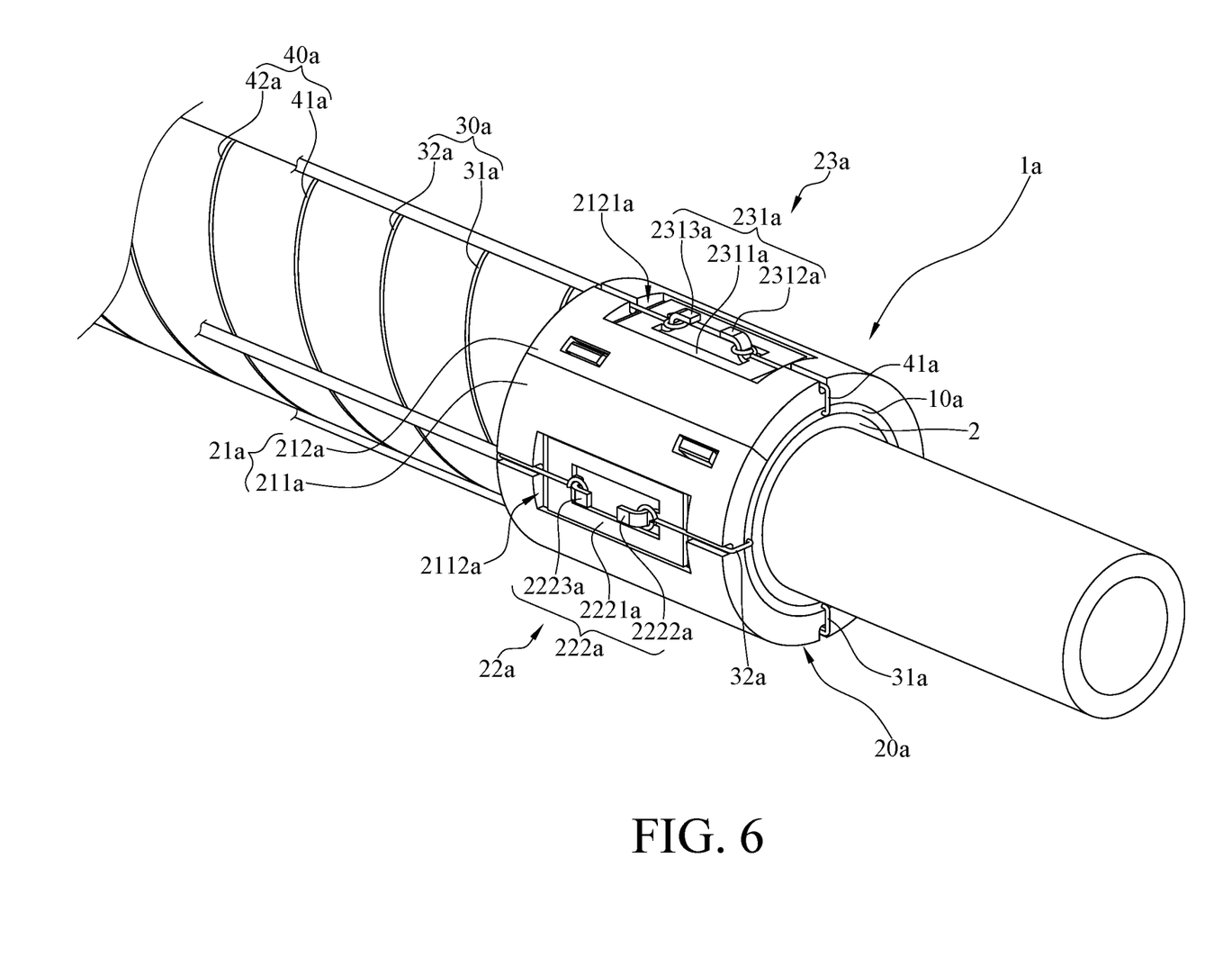
FIG. 6 is a perspective view of a fluid leak detector being disposed on a flow tube according to a second embodiment of the present disclosure.
Figure 7:
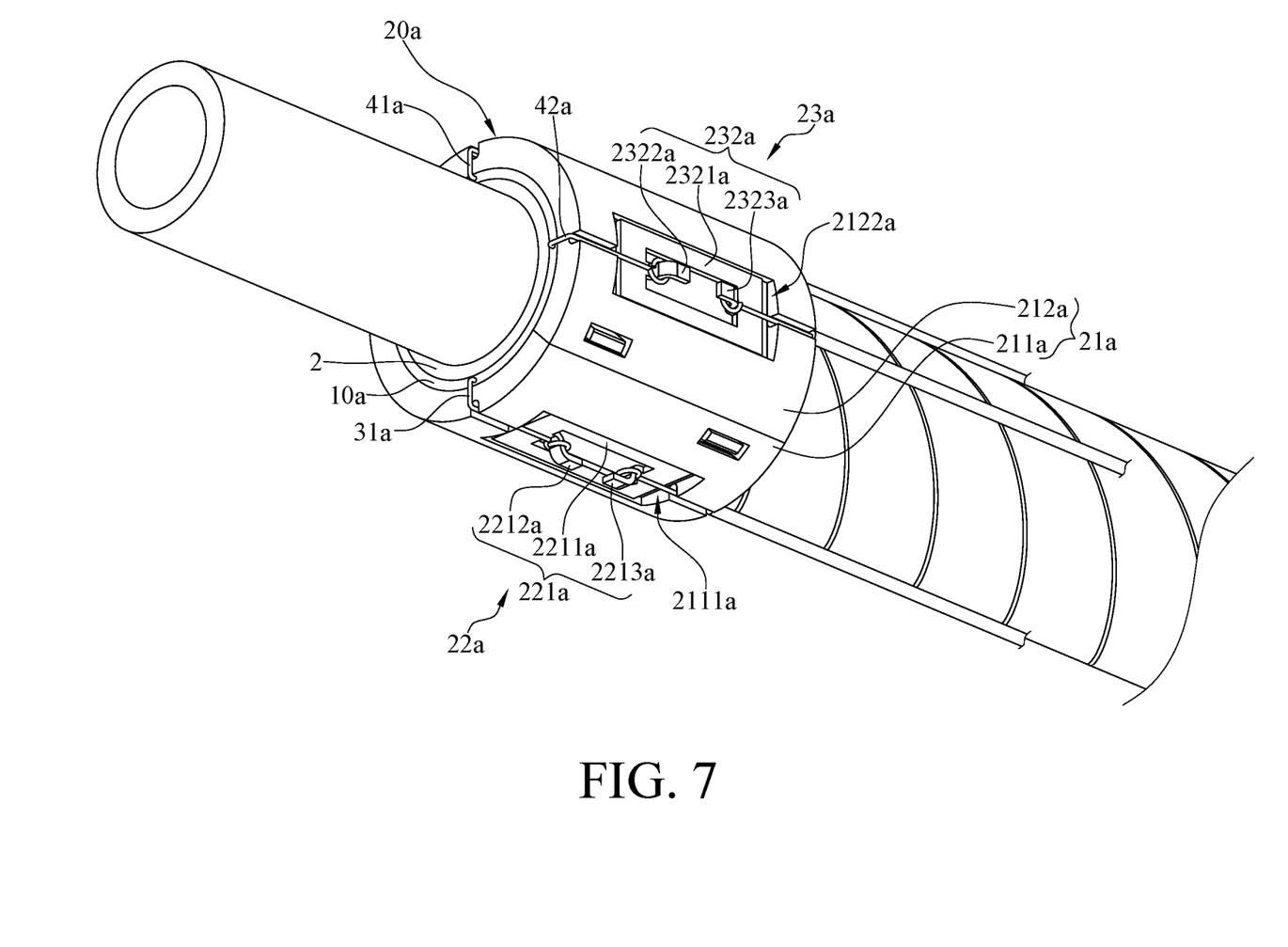
FIG. 7 is another perspective view of the fluid leak detector and the flow tube in FIG. 6.
Figure 8:
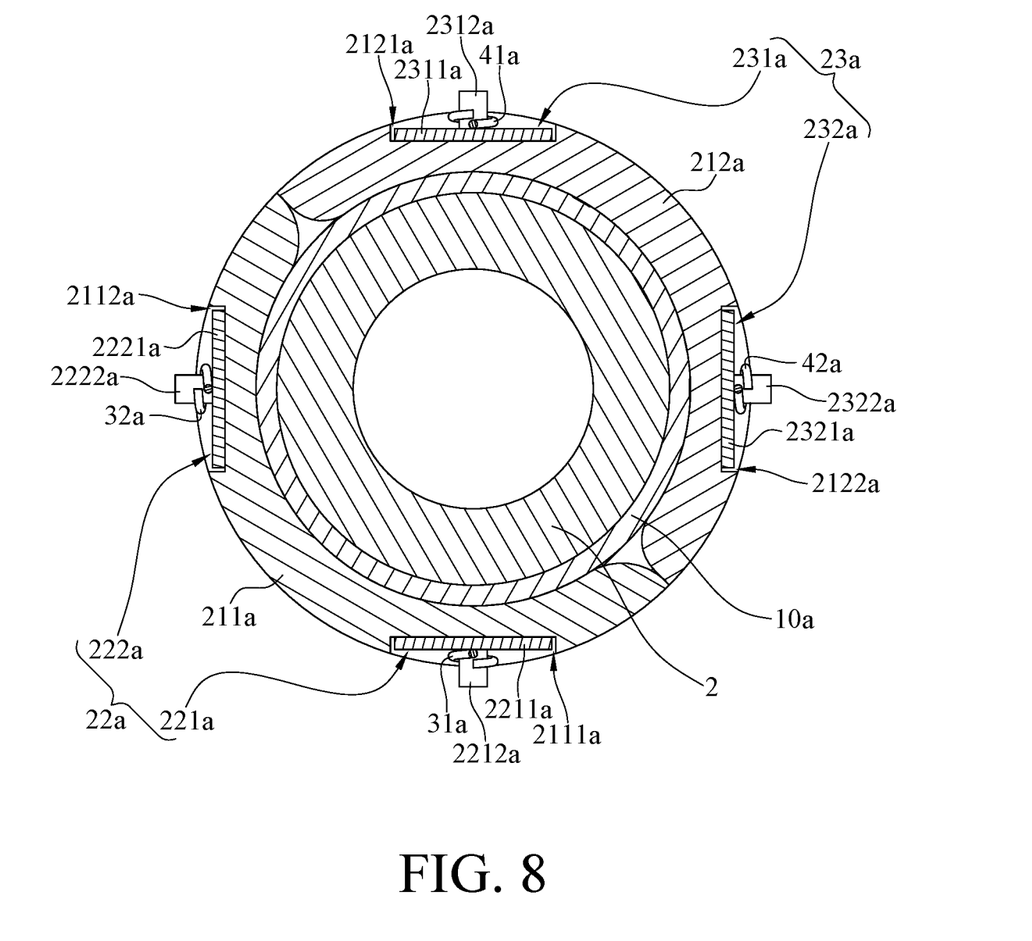
FIG. 8 is a cross-sectional view of the fluid leak detector and the flow tube in FIG. 6.

In this embodiment, the fluid leak detector 1 includes the connecting terminal sets 50 and 60, but the disclosure is no limited thereto. Please refer to FIG. 6 to FIG. 8. FIG. 6 is a perspective view of a fluid leak detector being disposed on a flow tube according to a second embodiment of the present disclosure. FIG. 7 is another perspective view of the fluid leak detector and the flow tube in FIG. 6. FIG. 8 is a cross-sectional view of the fluid leak detector and the flow tube in FIG. 6.

This embodiment provides a fluid leak detector 1a including an insulation sleeve 10a, a fastener 20a and two wire sets 30a and 40a.

The insulation sleeve 10a is configured to be sleeved on a flow tube 2 and has water absorption property. The fastener 20a includes a mount base 21a and two conductive terminal sets 22a, 23a. The mount base 21a includes a first mounting component 211a and a second mounting component 212a. The first mounting component 211a and the second mounting component 212a are detachably assembled together so as to surround the insulation sleeve 10a. The first mounting component 211a has a first assembly groove 2111a and a second assembly groove 2112a, and the second mounting component 212a has a first assembly groove 2121a and a second assembly groove 2122a. The first assembly groove 2111a and the second assembly groove 2112a of the first mounting component 211a are separated from each other, and the first assembly groove 2121a and the second assembly groove 2122a of the second mounting component 212a are separated from each other. The first assembly grooves 2111a and 2121a and the second assembly grooves 2112a and 2122a are located at different sides of the insulation sleeve 10a. Specifically, the two first assembly grooves 2111a and 2121a are located at two opposite sides of the insulation sleeve 10a, and the two second assembly grooves 2112a and 2122a are located at another two opposite sides of the insulation sleeve 10a.

The wire set 30a includes a first electrode wire 31a and a second electrode wire 32a, and the wire set 40a includes a first electrode wire 41a and a second electrode wire 42a. The two first electrode wires 31a and 41a and the two second electrode wires 32a and 42a are, for example, copper wires and are disposed on the insulation sleeve 10a. In more detail, the two first electrode wires 31a and 41a and the two second electrode wires 32a and 42a are, for example, woven with the material of the insulation sleeve 10a and are arranged in a helical manner. Also, the first electrode wires 31a and 41a and the second electrode wires 32a and 42a are arranged alternately.

The conductive terminal set 22a includes a first conductive terminal 221a and a second conductive terminal 222a, and the conductive terminal set 23a includes a first conductive terminal 231a and a second conductive terminal 232a. The first conductive terminal 221a includes a base portion 2211a and a first connecting portion 2212a. The second conductive terminal 222a includes a base portion 2221a and a first connecting portion 2222a. The first conductive terminal 231a includes a base portion 2311a and a first connecting portion 2312a. The second conductive terminal 232a includes a base portion 2321a and a first connecting portion 2322a. The base portion 2211a of the first conductive terminal 221a, the base portion 2221a of the second conductive terminal 222a, the base portion 2311a of the first conductive terminal 231a, and the base portion 2321a of the second conductive terminal 232a are respectively disposed in the first assembly groove 2111a and the second assembly groove 2112a of the first mounting component 211a and the first assembly groove 2121a and the second assembly groove 2122a of the second mounting component 212a. The first connecting portion 2212a of the first conductive terminal 221a and the first connecting portion 2222a of the second conductive terminal 222a respectively protrude from an end of the base portions 2211a and 2221a away from the first mounting component 211a. The second connecting portion 2213a of the first conductive terminal 221a and the second connecting portion 2223a of the second conductive terminal 222a respectively protrude from another end of the base portions 2211a and 2221a away from the first mounting component 211a. The first connecting portion 2312a of the first conductive terminal 231a and the first connecting portion 2322a of the second conductive terminal 232a respectively protrude from an end of the base portions 2311a and 2321a away from the second mounting component 212a. The second connecting portion 2313a of the first conductive terminal 231a and the second connecting portion 2323a of the second conductive terminal 232a respectively protrude from another end of the base portions 2313a and 2323a away from the second mounting component 212a. In this embodiment, the two first electrode wires 31a and 41a and the two second electrode wires 32a and 42a are respectively disposed at four first connecting portion 2212a, 2312a, 2222a and 2322a.

Figure 9:
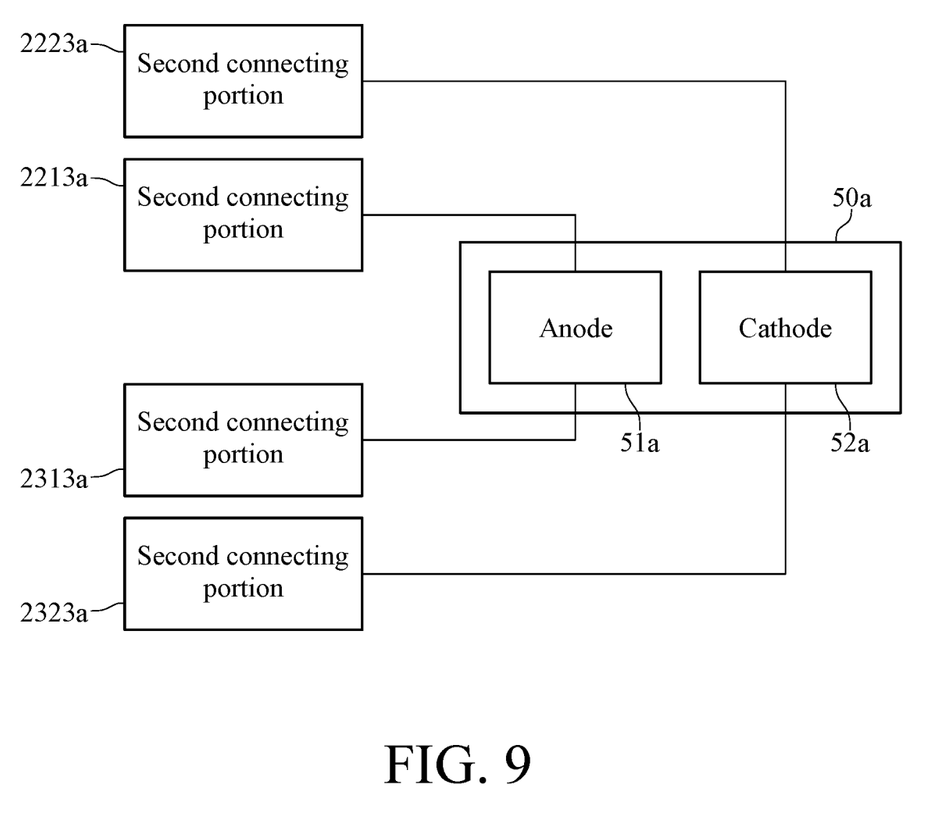
FIG. 9 is a block diagram that shows the connections among some of the components in the fluid leak detector in FIG. 6.

Please refer to FIG. 9. FIG. 9 is a block diagram that shows the connections among some of the components in the fluid leak detector in FIG. 6. As shown in FIG. 9, the fluid leak detector 1a further includes a signaling device 50a, which is, for example, a light-emitting diode. The signaling device 50a has an anode 51a and a cathode 52a. The second connecting portion 2213a of the first conductive terminal 221a and the second connecting portion 2313a of the first conductive terminal 231a are electrically connected to the anode 51a of the signaling device 50a. The second connecting portion 2223a of the second conductive terminal 222a and the second connecting portion 2323a of the second conductive terminal 232a are electrically connected to the cathode 52a of the signaling device 50a. In this embodiment, the fluid leak detection of the fluid leak detector 1a is similar to the fluid leak detection of the fluid leak detector 1 shown in FIG. 1 and will be not described again.

Figure 10:
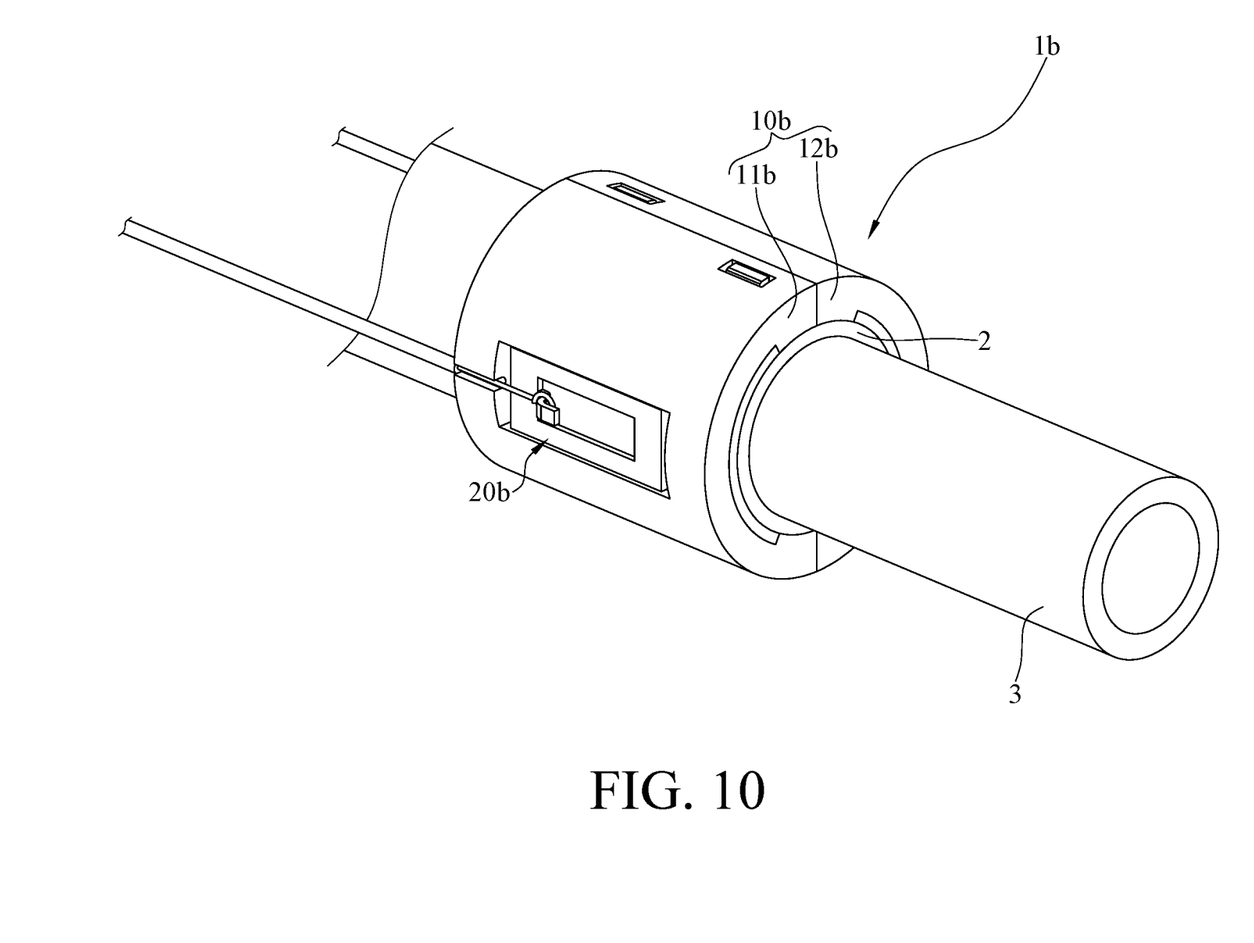
FIG. 10 is a perspective view of a fluid leak detector being disposed on a flow tube according to a third embodiment of the present disclosure.
Figure 11:
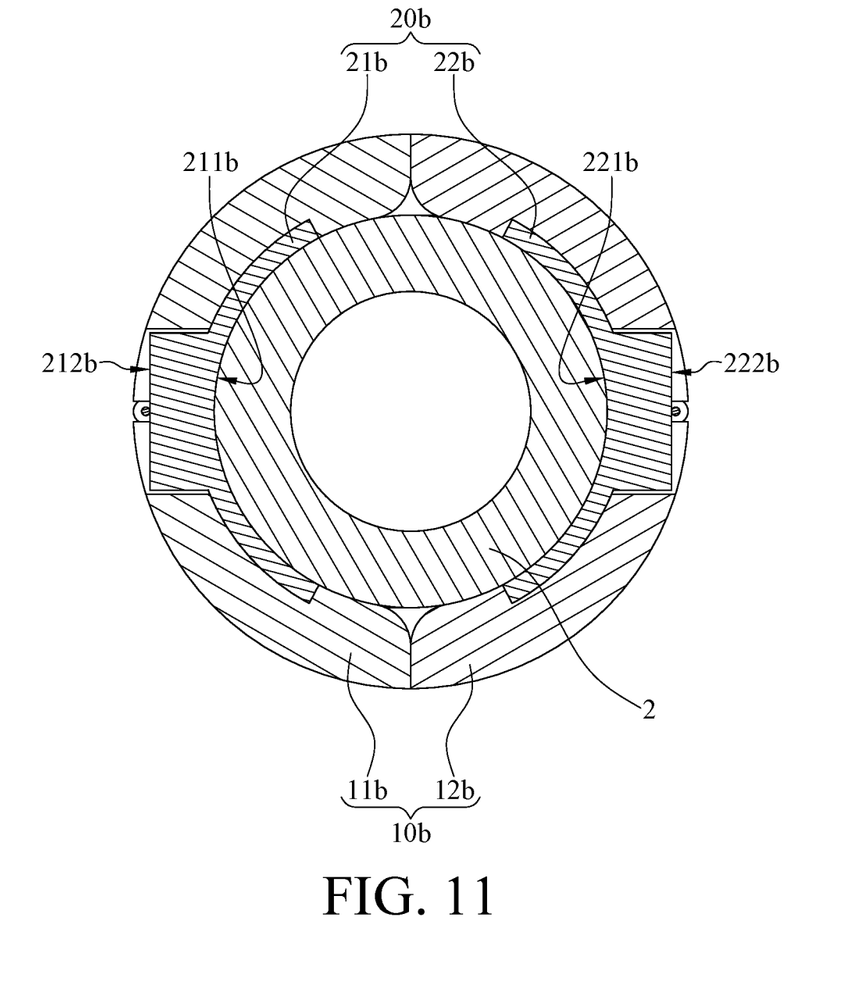
FIG. 11 is a cross-sectional view of the fluid leak detector and the flow tube in FIG. 10.
Figure 12:
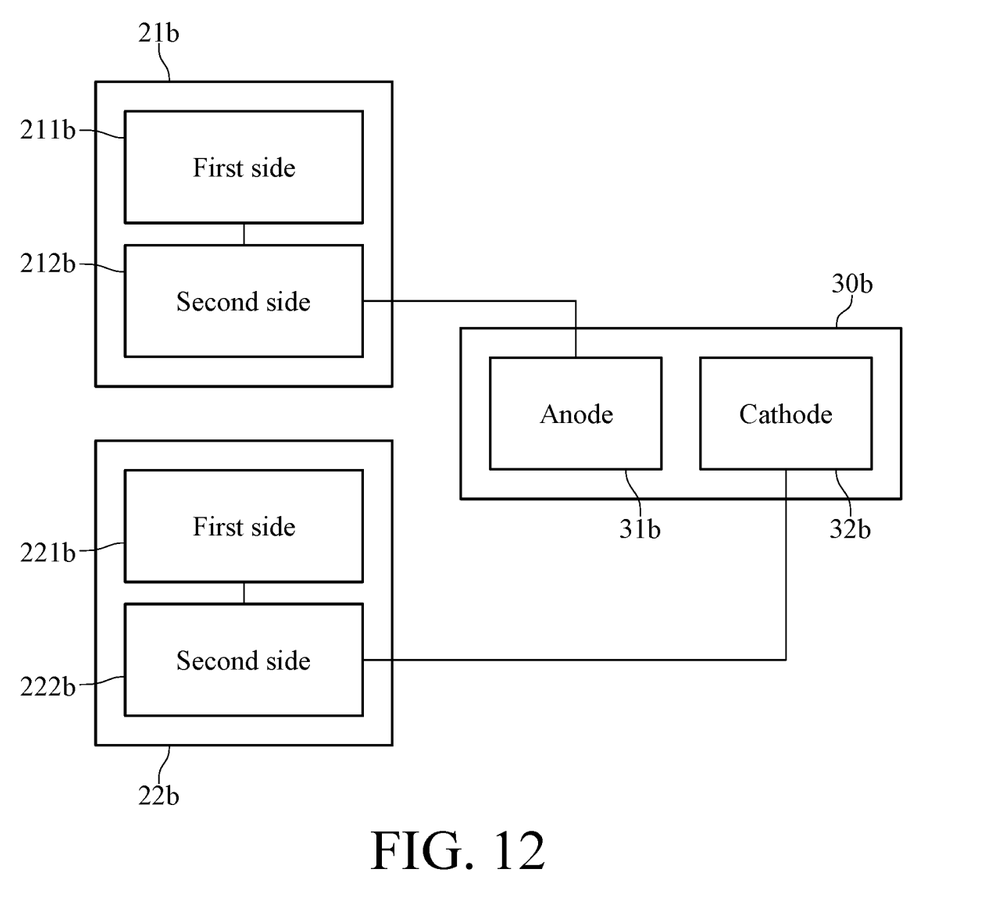
FIG. 12 is a block diagram that shows the connections among some of the components in the fluid leak detector in FIG. 10.

In the embodiments abovementioned, the fluid leak detectors each include the insulation sleeve, but the disclosure is not limited thereto. Please refer to FIG. 10 to FIG. 12. FIG. 10 is a perspective view of a fluid leak detector being disposed on a flow tube according to a third embodiment of the present disclosure. FIG. 11 is a cross-sectional view of the fluid leak detector and the flow tube in FIG. 10. FIG. 12 is a block diagram that shows the connections among some of the components in the fluid leak detector in FIG. 10.

In this embodiment provides a fluid leak detector 1b including a mount base 10b, a conductive terminal set 20b and a signaling device 30b.

The mount base 10b includes a first mounting component 11b and a second mounting component 12b. The first mounting component 11b and the second mounting component 12b are detachably assembled together so as to surround a flow tube 2.

The conductive terminal set 20b includes a first conductive terminal 21b and a second conductive terminal 22b. The first conductive terminal 21b and the second conductive terminal 22b are respectively disposed through the first mounting component 11b and the second mounting component 12b. The first conductive terminal 21b and the second conductive terminal 22b are separated from each other. The first conductive terminal 21b has a first side 211b and a second side 212b, and the second conductive terminal 22b has a first side 221b and a second side 222b. The first side 211b of the first conductive terminal 21b and the first side 221b of the second conductive terminal 22b are configured to press against the flow tube 2. The second side 212b of the first conductive terminal 21b and the second side 222b of the second conductive terminal 22b are exposed.

As shown in FIG. 11 and FIG. 12, the signaling device 30b is, for example, a light-emitting diode. The signaling device 30b has an anode 31b and a cathode 32b. The second side 212b of the first conductive terminal 21b and the second side 222b of the second conductive terminal 22b are respectively electrically connected to the anode 31b and the cathode 32b of the signaling device 30b. When fluid leaks from a crack of the flow tube 2, the first conductive terminal 21b and the second conductive terminal 22b are able to be electrically connected to each other via the leaking fluid. As a result, the signaling device 30b is turned on to warn the user that the existence of a fluid leak in the flow tube 2.

As shown in FIG. 10, the mount base 10b is, for example, sleeved on the joint of the flow tube 2 and a connector 3, where is easily broken by an external force. The fluid leak detector 1b is able to detect a fluid leak on the joint of the flow tube 2 and the connector 3 in time.

In this embodiment, the mount base 10b is sleeved on the joint of the flow tube 2 and the connector 3, but the disclosure is not limited thereto. In other embodiments, the mount base can surround any place of the flow tube which is easily broken.

According to the fluid leak detector in the embodiments abovementioned, the first electrode wire and the second electrode wire are connected to each other via the insulation sleeve that has water absorption property, thus the insulation sleeve is able to absorb fluid which leaks from the flow tube, and then the first electrode wire and the second electrode wire can be electrically connected to each other by the fluid in the insulation sleeve so as to turn on the signaling device that is electrically connected thereto, timely sending out the warning of the existence of a fluid leak in the flow tube.

In addition, since the first electrode wire and the second electrode wire are arranged alternately, wherever the fluid leak occurs on the fluid tube, such as between the first electrode wire and the second electrode wire, the signaling device all can be turned by the fluid leak from the crack. Therefore, the arrangement of the first electrode wire and the second electrode wire helps to improve the sensitivity of detecting the fluid leak on the flow tube.

In addition, the first side of the first conductive terminal and the second conductive terminal can be configured to press against the crack of the flow tube. When the fluid leaks from s crack of the flow tube, the first conductive terminal and the second conductive terminal are able to be electrically connected to each other via the leaking fluid. As a result, the signaling device is turned on to warn the user that the existence of a fluid leak on the flow tube.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A fluid leak detector, configured to be disposed on a flow tube, the fluid leak detector comprising:
    an insulation sleeve, having water absorption property, and configured to be sleeved on the flow tube; and
    at least one wire set, comprising a first electrode wire and a second electrode wire, the first electrode wire and the second electrode wire being disposed on the insulation sleeve, and the first electrode wire and the second electrode wire being separated from each other but being connected to each other via the insulation sleeve;
    a fastener, the fastener comprising a mount base and at least one conductive terminal set, the mount base being sleeved on the insulation sleeve, the at least one conductive terminal set comprising a first conductive terminal and a second conductive terminal, the first conductive terminal and the second conductive terminal being disposed on the mount base and being separated from each other, the first electrode wire and the second electrode wire being helically wound on the flow tube, and the first electrode wire and the second electrode wire being respectively electrically connected to the first conductive terminal and the second conductive terminal;
    wherein the first conductive terminal and the second conductive terminal each comprise a base portion, which is disposed on the mount base, and a connecting portion, which protrudes from the base portion away from the mount base, and the first electrode wire and the second electrode wire are respectively disposed at the connecting portions of the first conductive terminal and the second conductive terminal.

2. The fluid leak detector according to claim 1, wherein the amount of the at least one wire set is two, and the two first electrode wires and the two second electrode wires of the two wire sets are arranged alternately.

3. The fluid leak detector according to claim 1, further comprising a signaling device, and the first electrode wire and the second electrode wire being respectively electrically connected to two opposite electrodes of the signaling device.

4. The fluid leak detector according to claim 3, wherein the signaling device is a light-emitting diode or a buzzer.

5. The fluid leak detector according to claim 1, further comprising a connecting terminal set, the connecting terminal set comprising a first connecting terminal and a second connecting terminal, the mount base having a first assembly groove and a second assembly groove, the first conductive terminal and the second conductive terminal being respectively located in the first assembly groove and the second assembly groove, the first connecting terminal and the second connecting terminal being respectively detachably disposed in the first assembly groove and the second assembly groove, and the first connecting terminal and the second connecting terminal being respectively electrically connected to the first electrode wire and the second electrode wire.

6. The fluid leak detector according to claim 5, wherein the first connecting terminal and the second connecting terminal each comprise a cover and a conductive component, which is disposed to the cover, the covers of the first connecting terminal and the second connecting terminal are respectively detachably disposed at the first assembly groove and the second assembly groove, and the conductive components of the first connecting terminal and the second connecting terminal respectively press against the first electrode wire and the second electrode wire.

7. The fluid leak detector according to claim 1, wherein the mount base comprises a first mounting component and a second mounting component, which are detachably assembled together.

8. The fluid leak detector according to claim 1, wherein the first conductive terminal and the second conductive terminal each comprise a base portion, which is disposed on the mount base, a first connecting portion, which protrudes from an end of the base portion away from the mount base, and a second connecting portion, which protrudes from another end of the base portion away from the mount base, and the first electrode wire and the second electrode wire are respectively disposed at the first connecting portions of the first conductive terminal and the second conductive terminal.

9. The fluid leak detector according to claim 8, further comprising a signaling device, the second connecting portions of the first conductive terminal and the second conductive terminal are respectively electrically connected to two opposite electrodes of the signaling device.

10. The fluid leak detector according to claim 9, wherein the signaling device is a light-emitting diode or a buzzer.

11. A fluid leak detector, configured to be disposed on a flow tube, the fluid detector comprising:
    a mount base, configured to surround the flow tube and having a first slot and a second slot, which are separated from each other; and
    at least one conductive terminal set, comprising a first conductive terminal and a second conductive terminal, the first conductive terminal and the second conductive terminal being respectively located in the first slot and the second slot of the mount base and being separated from each other, the mount base is configured to press against the first conductive terminal and the second conductive terminal and the first conductive terminal and the second conductive terminal each having a first side, which is configured to press against the flow tube and a second side, which is exposed.

12. The fluid leak detector according to claim 11, wherein the first conductive terminal and the second conductive terminal are disposed through the mount base.

13. The fluid leak detector according to claim 11, further comprising a signaling device, the second sides of the first conductive terminal and the second conductive terminal being respectively electrically connected to two opposite electrodes of the signaling device.

14. The fluid leak detector according to claim 13, wherein the signaling device is a light-emitting diode or a buzzer.

* * * * *